United States Patent [19]

Tzidon et al.

[11] Patent Number: 5,396,644
[45] Date of Patent: Mar. 7, 1995

[54] METHOD AND SYSTEM OF COMMUNICATION BETWEEN MOVING PARTICIPANTS

[75] Inventors: Aviv Tzidon, Azor; Amir Schorr, Tel-Aviv, both of Israel

[73] Assignee: B.V.R. Technologies, Ltd., Israel

[21] Appl. No.: 10,745

[22] Filed: Jan. 29, 1993

[30] Foreign Application Priority Data

Jan. 30, 1992 [IL] Israel .................................... 100804

[51] Int. Cl.⁶ .......................... H04J 3/16; H04Q 5/22; H04B 7/00
[52] U.S. Cl. ................................ 455/33.1; 455/51.1; 455/54.2; 370/85.6; 340/825.51; 379/58
[58] Field of Search ................ 370/95.1, 95.3, 85.2, 370/85.6, 85.7; 340/825.5, 825.51, 825.05; 455/33.1, 33.4, 54.1, 54.2, 58.2, 63, 67.1; 379/58, 59

[56] References Cited

U.S. PATENT DOCUMENTS

| | | | |
|---|---|---|---|
| 4,823,111 | 4/1989 | Tsuchiya et al. | 340/825.050 |
| 5,159,593 | 10/1992 | D'Amico et al. | 370/85.6 |
| 5,208,805 | 5/1993 | Ochiai | 370/85.6 |

*Primary Examiner*—Edward F. Urban
*Assistant Examiner*—Lisa Charouel
*Attorney, Agent, or Firm*—Leonard Bloom

[57] ABSTRACT

A method and system of communicating between moving participants such that each participant is provided with a first time slice and a respective priority listing containing the name of each participant once only, each participant thus having the top priority for one first time slice only. Also allocated to each participant is a second time slice during which he must transmit his identity as well as the identities of all his near neighbors within a radius R thereof. For each participant A there is stored the identity of all near neighbors B(A) and all far neighbors C(A) being within a radius R of his near neighbors B(A) and who are not also near neighbors B(A) of A. During each first time slice, any participant having a higher priority for the respective first time slice than all of his near and far neighbors may transmit data including the identities of at least those of his near neighbors who became near neighbors since his previous transmission. During each second time slice, non-transmitting participants update their respective list of near neighbors in respect of a transmitting participant according to whether his transmission is, or is not, received by them.

3 Claims, 4 Drawing Sheets

METHOD AND SYSTEM OF COMMUNICATION BETWEEN MOVING PARTICIPANTS

FIELD OF THE INVENTION

This invention relates to a method and system for effecting data communication between a number of non-stationary participants.

BACKGROUND OF THE INVENTION

Communication between a transmitter and a receiver is only effective within a predetermined radius R. When data communication is required between moving participants each of whom is provided with a suitable transmitter and receiver, each participant would receive data transmitted by any other participant within a radius R thereof unless, of course, steps were taken to prevent this. Whilst it is possible to allocate different transmission frequencies to each of the participants, this is not feasible when completely reciprocal data communication is required between all of the participants. Such reciprocal data communication is a requirement, for example, in military aircraft where a limited number of pilots must be able to maintain contact with other friendly pilots all of whom must, therefore, transmit and receive data at the same frequency.

In such data communication, it is clearly an imperative that a pilot receive data from only one transmitter at any given time in order to avoid the confusion which would result from more than one transmission being received simultaneously. At its simplest, this desideratum can always be achieved by allocating time slices to each of the participants so that only one can transmit during any given time slice. According to such an approach, each participant transmits data during his time slice only and all participants within a radius R of the transmitting participant will receive the transmitted data.

However, although simple, such an approach is inefficient because it prohibits a participant from transmitting data, other than during his allotted time slice, even if there is absolutely no danger of a receiver receiving two such transmissions simultaneously. Put another way, if a participant A wishes to transmit data to his neighbor B at the same time as another participant C wishes to transmit data to his neighbor D, even if A and B on the one hand and C and D on the other hand, are so far apart that there would be no danger of A or B receiving C's transmission or of C or D receiving A's transmission, C is prevented from transmitting during A's time slice and, of course vice versa.

It would clearly be desirable to effect the desired data communication in accordance with a method that would take into consideration the mutual separation between the participants. However, bearing in mind that all of the participants are moving with respect to each other and, in the particular case of fighter aircraft are moving at very high speeds indeed, this is clearly no easy task.

SUMMARY OF THE INVENTION

It is an object of the invention to provide a method and system for effecting the required bi-directional data communication between a finite number N of non-stationary participants, such that the problems associated with hitherto proposed such methods are significantly reduced or eliminated.

According to a broad aspect of the invention there is provided a method for data communication between a finite number N of non-stationary participants, wherein each of said participants can both transmit and receive data over a maximum predetermined distance R and may receive only one data communication at any given time, the method comprises the steps of:
(a) defining N priority listings, each of said participants appearing only once in each of said priority listings in a different position, correlation between successive priority listings being minimal,
(b) allocating N first time slices, each of said priority listings being operative during a respective one of said N first time slices,
(c) allocating N second time slices, a respective one M of said participants transmitting his identity as well as respective identities of all of hie near neighbors B(M) being within a radius R thereof,
(d) storing for each participant A an identity of all his near neighbors B(A) within the radius R thereof and an identity of all his far neighbors C(A) being within a radius 2R of the each participant A, said far neighbors C(A) are not being among said near neighbors B(A) of the each participant A,
(e) during one of the N first time slices allowing said each participant A to transmit the data only if said each participant A has the highest priority among all said near neighbors B(A) and said far neighbors C(A) stored in the third memory, said data including the identities of at least those of said near neighbors B(A) who became new near neighbors since a previous transmission,
(f) repeating steps (d) and (e) for each of said N first time slices,
(g) during each of said N second time slices, for the each participant A receiving the data transmitted from said respective one M of said participants not included in said near neighbors B(A) of said each participant A, adding said respective one M of said participants to said near neighbors B(A) of said each participant A,
(h) during each of said N second time slices, for the each participant A not receiving the data transmitted from said respective one M of said participants included in said respective near neighbors B(A), deleting said respective one M of said participants from said near neighbors B(A) and deleting from said respective far neighbors C(A) any :near neighbors B(M) of said respective one M of said participants who are not also said near neighbors B(A) of said each participant A, and
(i) repeating steps (g) and (h) for each of said N second time slices.

A system for data communication between a finite number N of non-stationary participants, according to above-described method comprises in respect to each participant A:
  a transmitter for transmitting data over a maximum predetermined distance R,
  a receiver for receiving the data transmitted to said each participant A,
  processing means coupled to the transmitter and to the receiver for processing the data transmitted and received thereby in accordance with a predetermined instruction set,
  a first memory coupled to the processing means for storing the predetermined instruction set, a second memory coupled to the processing means for storing therein a plurality N of different priority listings, each for the finite number of N participants appearing only once in each priority listing in a different position, correlation between successive priority listings being minimal, a third memory for storing therein an identity of all near neighbors B(A) of said each participant A being within a radius R of said each participant A and an identity of all far neighbors C(A) of said each participant A being within a radius 2R of said each participant A, said rat neighbors C(A) not being included among said near neighbors B(A) of said each participant A, global synchronizing means coupled to the processing means for synchronizing operation of said processing means with that of remaining N-1 processing means of remaining finite number N-1 participants, first allocating means coupled to the global synchronizing means for allocating N first time slices during each one of which a respective one of the stored priority listings is operative, and second allocating means coupled to the global synchronizing means for allocating N second time slices each for a corresponding participant.

In such a system, the processing means operates in accordance with the method described above.

Preferably, in the method according to the invention, communication is effected in a series of cycles each one of which contains N first time slices each in respect of one of the participants and a smaller subset m of second time slices each in respect of a corresponding number m of participants. A complete communication cycle would then include N/m such cycles such that in one complete cycle each participant A will become aware of any new neighbor within his broadcast range. Likewise, within one such complete cycle he will be informed by his near neighbors B(A) of all new far neighbors C(A).

When the participant A transmits during one of the first time slices, all of his near neighbors B(A) will hear him because each member of B(A) and C(A) are silent. This follows since, during the time slice that A transmits, the priority of all of A's near neighbors B(A) and C(A) have a lower priority than A and further because his near neighbors B(A) and his far neighbors C(A) are aware of A's existence and will therefore not attempt to communicate with each other during this time slice.

On the other hand, participants other than A's near neighbors B(A) and far neighbors C(A) can indeed transmit at the same time as A without danger of interference with A.

BRIEF DESCRIPTION OF THE DRAWINGS

For a better understanding of the invention and to see how the same may be carried out in practice, a preferred embodiment will now be described, by way of non-limiting example only, with reference to the accompanying drawings, in which.

DETAILED DESCRIPTION OF A PREFERRED EMBODIMENT

Figure 1:
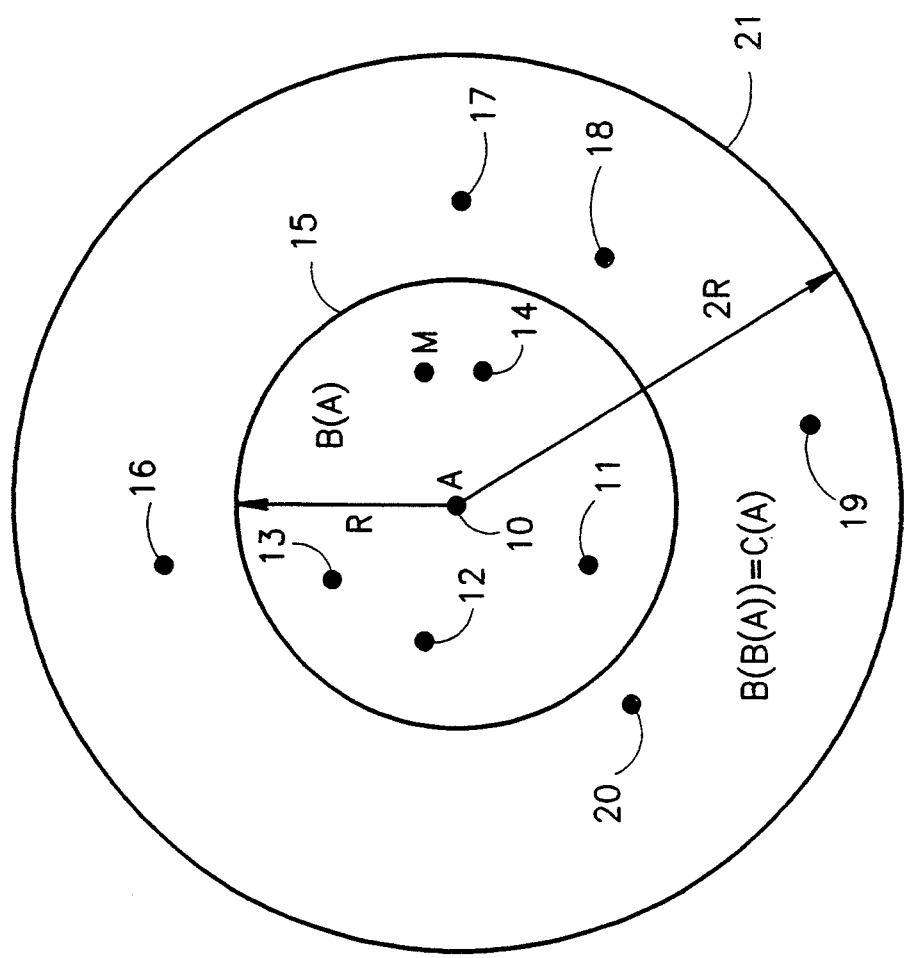
FIG. 1 is a schematic diagram useful in explaining some of the terminology associated with the invention.

Referring to FIG. 1 there is shown a participant 10 surrounded by a series of other participants 11, 12, 13 and 14 all of whom are in a circle 15 radius R of the participant 10. Within a distance R of each of the participants 11, 12, 13 and 14 are additional participants 16, 17, 18, 19 and 20 whose distance from the participant 10 exceeds R.

Since the distance of the participant 10 from the participants 11, 12, 13 and 14 is no greater than R, each of the participants 10-14 is within communication range of one another. Likewise, since the distance from the participant 13 to the participant 16 or from the participant 14 to the participants 17 and 18, for example, is no greater than R mutual communication between these participants also is possible. On the other hand, since the distance from the participant 10 to any of the participants 16-20 exceeds R, communication between the participant 10 and any of these participants is clearly not possible.

During the following explanation, the participant 10 will be denoted by A, the participants 11-14 will be denoted by B(A) and are referred to as the near neighbors of A and the participants 16-20 will be denoted as C(A) and are referred to as the far neighbors of A. The significance of these designations will now be explained. Since the maximum distance from A to a near neighbor B(A) of A is equal to R and the maximum distance from that near neighbor B(A) to a far neighbor C(A) of A is likewise equal to R, it follows that the maximum distance between A and the far neighbors C(A) of A is equal to 2R. Thus, the far neighbors C(A) of A all lie within a ring defined by the circle 15 and an outer circle 21 of radius 2R center on A.

The near neighbors of A, i.e. B(A) are all within communication range of A. Clearly, they may not necessarily all be within communication range of each other since, for example, the distance between the participant 11 and the participant 13 clearly exceeds R. However, in the following explanation, the method will be described with particular reference to the participant 10 designated as A, it being understood that exactly the same principles apply mutatis mutandis to all of the remaining participants the designations A, B(A) and C(A) applying to different participants as appropriate.

It will be further appreciated that the situation depicted in FIG. 1 will normally be repeated in respect of similar sets of participants outside the circumference of the second circle 21 of radius 2R from A. So far as such other sets of participants are concerned, the respective central participant A can both transmit data to and receive data from all of his near neighbors B(A) without any danger of interference with similar data transmissions in respect of adjacent sets of participants seeing that all such central participants A as well as their near neighbors B(A) are displaced more than the limiting radius R from one another.

It should further be understood that the far neighbors of A i.e. C(A), being within the limiting radius R of at least some of A's near neighbors B(A) can communicate with those near neighbors B(A) of A. Thus, it is necessary to ensure that any danger of interference between A transmitting to his near neighbors B(A) at the same time as his far neighbors C(A) transmit to the same near neighbors B(A) is prevented.

A further consideration is that the situation depicted in FIG. 1 is dynamic and constantly changing. That is to say, that even though the central participant 10 depicted as A will always be stationary relative to himself, his near and far neighbors B(A) and C(A), respectively, are in a constant state of flux with different participants both entering and leaving the circles 15 and 21 continuously.

Figure 2:
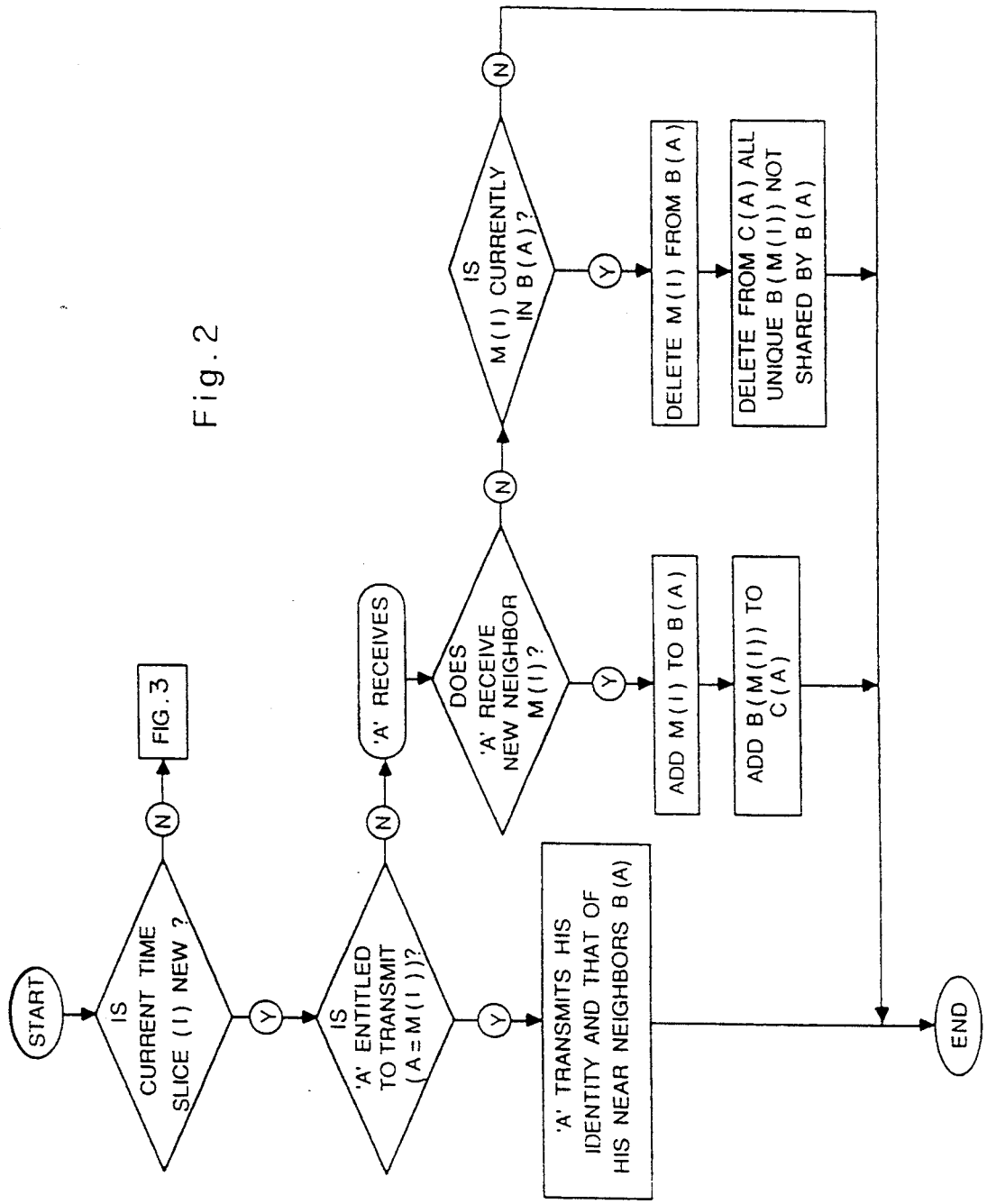
FIG. 2 is part of a flow diagram showing the principal steps in the method according to the invention.
Figure 3:
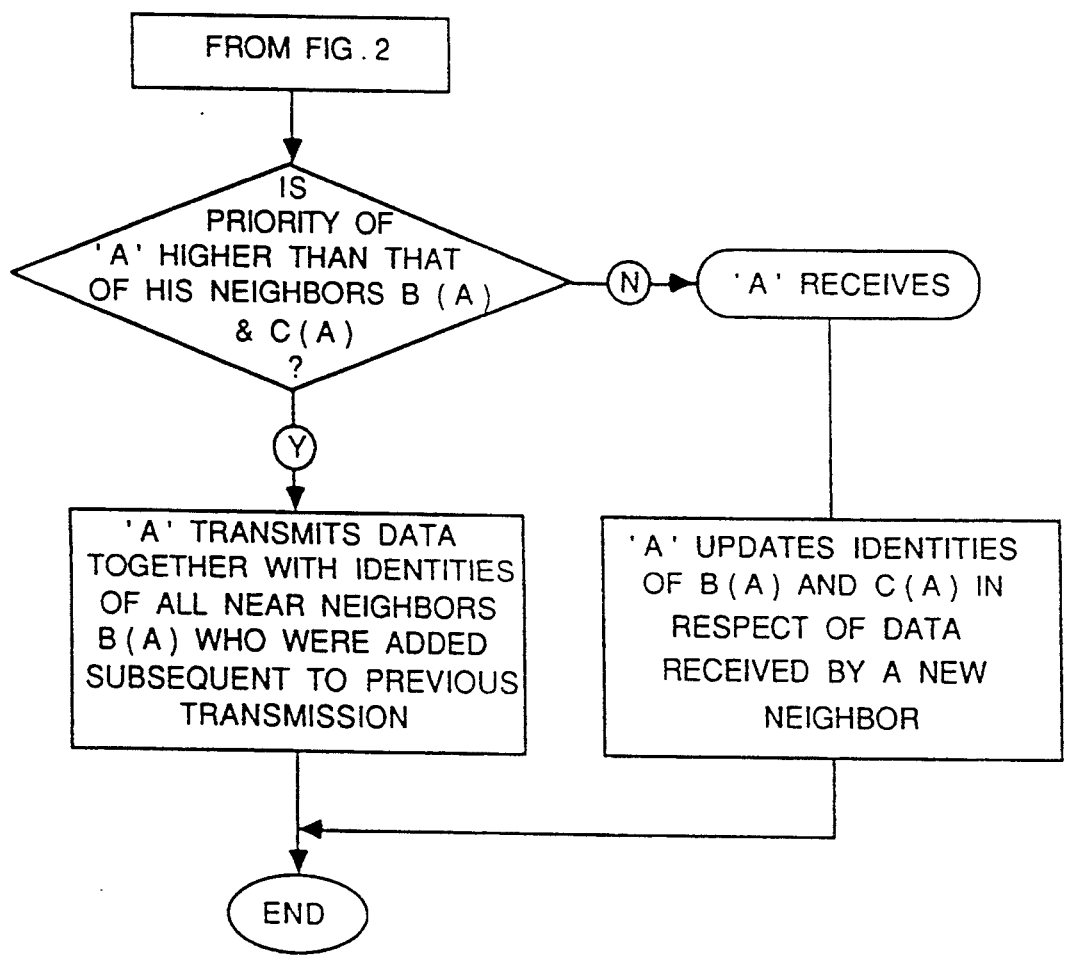
FIG. 3 is a continuation of the flow diagram shown in FIG. 2.

The method according to the invention will now be described with reference to FIG. 1 and to a flowchart of said method shown in FIGS. 2 and 3, respectively. On the assumption that the maximum number of participants is N, there are allocated N regular time slices (constituting first time slices) and a further N new time slices (constituting second time slices). During a regular time slice one or more participant may (optionally) transmit data providing that certain conditions are fulfilled which will be described below. During the new time slices one (and only one) of the participants is obliged to transmit his identification as well as the identity of all of his near neighbors B(A). Associated with each participant A are two types of listing: a plurality N of priority listings which is static and remains unchanged and a list of his near neighbors B(A) and of his far neighbors C(A) which is, of course, dynamic and constantly changing.

The N priority listings are allocated one for each of the regular time slices and are so arranged that each participant appears once only in each priority listing and appears in each of the priority listings in a different position. Thus, each participant will appear in one of the priority listings having the top priority, in a different priority listing as having the second priority and so on. The priority ordering between successive priority listings is so arranged that there is minimum correlation between the priority listings and particularly so between successive priority listings.

Preferably, transmission is effected in a series of cycles each of which includes a complete set N of regular time slices and a smaller subset m of new time slices. Thus, in N/m such cycles, there will be a complete set N of new time slices during which every single participant will be able to transmit his identity together with those of his near neighbors B(A).

The priority listings are known by all of the participants such that during any given general time slice, any participant may transmit data if, and only if, he has a higher priority than all of both his near neighbors B(A) and his far neighbors C(A). In order for this to be possible, the time slices are globally synchronized for all of the participants, each of the priority listings being associated with a respective one of the general time slices. In practice, by applying only the constraint that a particular participant A must have a higher priority than that of all of his near neighbors B(A) and his far neighbors C(A), more than one participant will generally be permitted to transmit simultaneously in a given time slice. This, of course, is a marked improvement over those systems which allocate a plurality of time slices, one in respect of each participant in each communication cycle, such that each participant may only transmit during his allocated time slice.

A further consequence of the proposed method is that each participant A will be able to transmit more information during the complete cycle by a factor approximately equal to N/(B(A)+C(A)) i.e. the total number of participants divided by the sum of his near and far neighbors. This, of course, compares with a static network wherein each user is permitted to transmit for a factor of only 1/N of the total cycle time.

Whenever a participant A transmits data during a regular time slice, he also transmits the identities of all those near neighbors B(A) who became his near neighbors since his previous transmission. Any of his near neighbors B(A) receiving such a transmission updates the identities of his respective far neighbors C(B(A)), as required, since each new near neighbor B(A) of A must either be a near neighbor of each of A's near neighbors or else a far neighbor thereof. By this means, all of the participants shown in FIG. 1 are constantly aware of each other's presence in spite of the fact that they are moving.

During a so-called new time slice, the respective participant A transmits his identity as well as the respective identities of all of his near neighbors B(A). All near neighbors B(A) of A receiving such a transmission will either recognize A as a previous near neighbor or will interpret him as a new near neighbor. In the latter case, such near neighbors will update their corresponding listings of near neighbors so as to include therein the identity of A.

On the other hand, if, during a new time slice, the transmitting participant A is not received by one or more of his currently defined near neighbors B(A), this indicates that although during his previous transmission A was one of their near neighbors, he has moved from them beyond the limiting radius R and so can no longer be so construed. Under these circumstances, those near neighbors no longer receiving the transmission from A, delete his identity from their respective listings of near neighbors and also delete from their respective listings of far neighbors any near neighbors of A B(A) who are not also their own near neighbors.

Thus, considering again the situation from the perspective of A, if he does not receive the transmission of one of his near neighbors B(A) during the new time slice allocated thereto, he deletes the identity of that particular near neighbor from his listing of near neighbors B(A) and also deletes from his respective listing of far neighbors C(A) any near neighbors B(B(A)) of the transmitting near neighbor who are not also near neighbors B(A) of A.

It will be appreciated that since most newcomers to the set B(A) will be from the group C(A) who are, in any case, already known to A, synchronization between a newcomer to A and the previous group of his near neighbors B(A) is normally not required.

Figure 4:
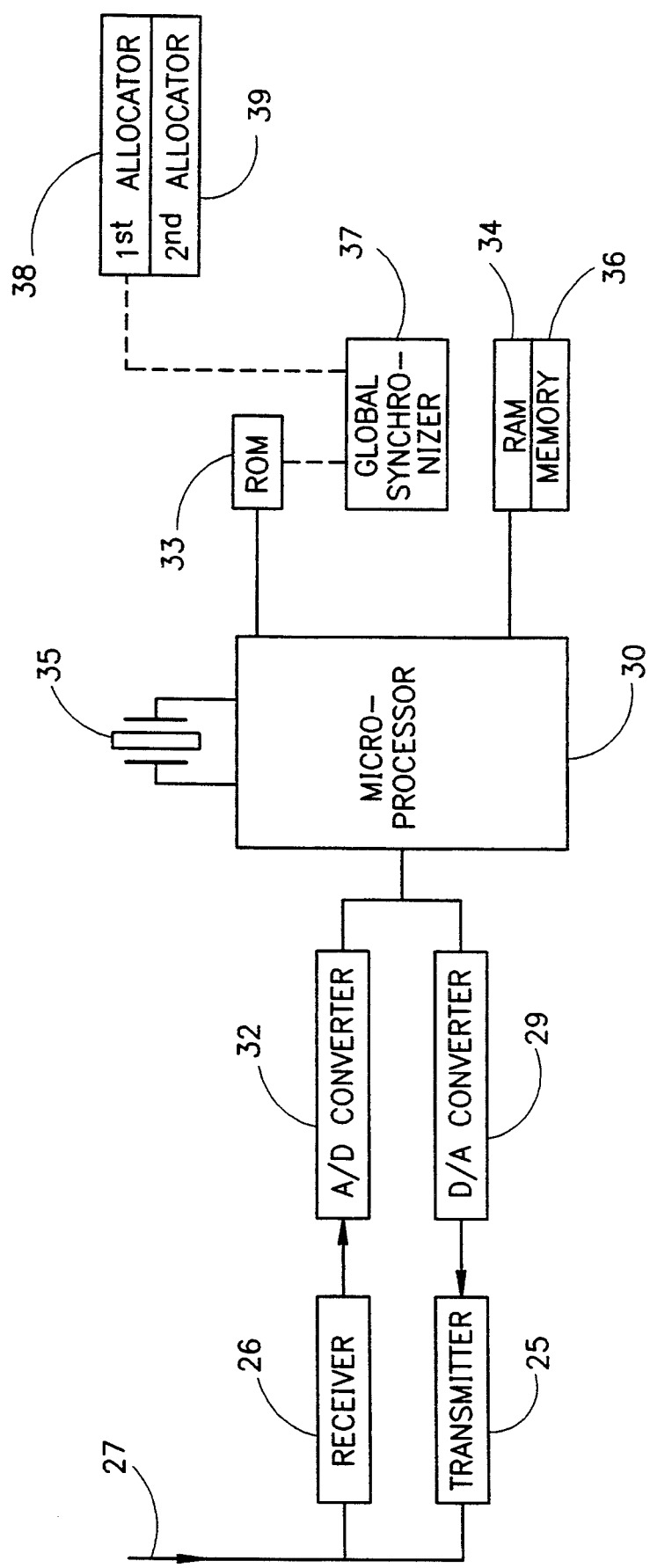
FIG. 4 is a block diagram showing functionally the principal components in a system according to the invention.

Referring now to FIG. 4 of the drawings there is shown a communications system for carrying out the method described above with reference to FIGS. 1-3 of the drawings. Thus, there is provided in respect of each one of the participants a transmitter 25 and a receiver 26 coupled to a common antenna 27. Coupled to the transmitter is a digital-to-analog (D/A) converter 29 coupled to a microprocessor 30. Likewise, there is coupled an analog-to-digital (A/D) converter 32 between the receiver 26 and the microprocessor 30.

A read only memory (ROM) 33 and a random access memory (RAM) 34 are coupled to the microprocessor 30 which receives timing signals via a quartz crystal 35.

The timing signals in respect of each of the microprocessors 30 for all of the participants are globally synchronized by global synchronizer 37, schematically shown in FIG. 4, so that all of the microprocessors 30 operate in exact synchronism in accordance with an instruction set stored in their respective ROMs 33.

Each of the priority listings referred to above is stored in the RAM 34 as also are the listings of the near and far neighbors of the respective participant.

Thus, under control of the microprocessor 30, the general and new time slices are allocated by first and second allocator 38, 39, respectively, schematically shown in FIG. 4, in accordance with the instruction set stored in the ROM 33 and for each allocated time slice, the microprocessor 30 checks whether the currently allocated time slice is a general time slice or a new time slice. In the case of a general time slice, a further check is made in the RAM 34 in order to derive the appropriate priority listing for that time slice, it then being established whether the priority of the respective participant is greater than the respective priorities of all of his near and far neighbors whose identities are stored in a memory 36 within the RAM 34.

Similarly, if the currently allocated time slice corresponds to a new time slice, the transmitter 25 of the respective participant is enabled, as required in accordance with the method described above, and his identity together with those of his near neighbors are automatically transmitted under control of the microprocessor 30.

In like manner, during any time slice when a respective participant is disabled from transmitting (either because, during a general time slice, at least one of his near or far neighbors has a higher priority or, during a new time slice, he has no authority to transmit) then his receiver 26 is automatically enabled for receiving any transmission of one of his near neighbors.

Under these circumstances, if a transmission is received by a participant A from a participant M whose identity is not recorded in his list of near neighbors B(A), then the identity of the transmitting participant M is added thereto and also the identities of the near neighbors B(M) of the transmitting participant M are added to his list of far neighbors C(A) stored in the RAM 34. If, on the other hand, the transmitting participant M is listed as one of 5his near neighbors B(A) but his transmission is not received, then the identity of the transmitting participant M is deleted from his list of near neighbors B(A) and those near neighbors B(M) of the transmitting participant M are deleted from the far neighbors C(A) stored in the RAM 34 unless they are also stored in the RAM 34 amongst the respective near neighbors B(A) of A.

By this means, each participant will generally be able to transmit more data during a given time than is possible in hitherto proposed communication systems, the proposed method and system being applicable for a finite, constant number of non-stationary participants.

We claim:

1. A method for data communication between a finite number N of non-stationary participants, wherein each of said participants can both transmit and receive data over a maximum predetermined distance R and may receive only one data communication at any given time, the method comprising the steps of:
    (a) defining N priority listings, each of said participants appearing only once in each of said priority listings in a different position, correlation between successive priority listings being minimal,
    (b) allocating N first time slices, each of said priority listings being operative during a respective one of said N first time slices,
    (c) allocating N second time slices, a respective one M of said participants transmitting his identity as well as respective identities of all of his near neighbors B(M) being within a radius R thereof,
    (d) storing for each participant A an identity of all his near neighbors B(A) within the radius R thereof and an identity of all his far neighbors C(A) being within a radius 2R of the each participant A, said far neighbors C(A) are not being among said near neighbors B(A) of the each participant A,
    (e) during one of the N first time slices allowing said each participant A to transmit the data only if said each participant A has the highest priority among all said near neighbors B(A) and said far neighbors C(A) stored in the third memory, said data including the identities of at least those of said near neighbors B(A) who became new near neighbors since a previous transmission,
    (f) repeating steps(d) and (e) for each of said N first time slices,
    (g) during each of said N second time slices, for the each participant A receiving the data transmitted from said respective one M of said participants not included in said near neighbors B(A) of said each participant A, adding said respective one M of said participants to said near neighbors B(A) of said each participant A,
    (h) during each of said N second time slices, for the each participant A not receiving the data transmitted from said respective one M of said participants included in said respective near neighbors B(A), deleting said respective one M of said participants from said near neighbors B(A) and deleting from said respective far neighbors C(A) any near neighbors B(M) of said respective one M of said participants who are not also said near neighbors B(A) of said each participant A, and
    (i) repeating steps (g) and (h) for each of said N second time slices.

2. The method according to claim 1, wherein said finite number N of said participants further includes a plurality of subsets m, each of which includes m participants (m<N), said method including the steps of:
    performing the step (i) for each of said subsets m, and
    repeating the steps (f) and (i) successively as required, each for a different subset m until step (i) has been performed for all of the finite number N participants.

3. A system for data communication between a finite number N of non-stationary participants, the system comprising in respect to each participant A:
    a transmitter for transmitting data over a maximum predetermined distance R,
    a receiver for receiving the data transmitted to said each participant A,
    processing means coupled to the transmitter and to the receiver for processing the data transmitted and received thereby in accordance with a predetermined instruction set,
    a first memory coupled to the processing means for storing the predetermined instruction set,
    a second memory coupled to the processing means for storing therein a plurality N of different priority listings, each for the finite number of N participants appearing only once in each priority listing in a different position, correlation between successive priority listings being minimal, a third memory for storing therein an identity of all near neighbors B(A) of said each participant A being within a radius R of said each participant A and an identity of all far neighbors C(A) of said each participant A being within a radius 2R of said each participant A, said far neighbors C(A) not being included among said near neighbors B(A) of said each participant A, global synchronizing means coupled to the processing means for synchronizing operation of said processing means with that of remaining N-1 processing means of remaining finite number N-1 participants, first allocating means coupled to the global synchronizing means for allocating N first time slices during each one of which a respective one of the stored priority listings is operative, and second allocating means coupled to the global synchronizing means for allocating N second time slices each for a corresponding participant;

said processing means operating as follows:
(a) during one of the N first time slices allowing said each participant A to transmit the data only if said each participant A has the highest priority among all said near neighbors B(A) and said far neighbors C(A) stored in the third memory, said data including the identities of at least those of said near neighbors B(A) who became new near neighbors since a previous transmission,
(b) during another one of the N first time slices, wherein said each participant A has a lower priority than at least one of said near neighbors B(A) and all of said far neighbors C(A):
  (i) enabling the receiver to receive any of the data transmitted by one of said near neighbors B(A). and
  (ii) updating the identities of said far neighbors C(A) according to the new near neighbors B(B(A)) of said one of said near neighbors B(A) who became the new near neighbors B(B(A)) since the previous transmission;
(c) during one of the N second time slices corresponding to said each participant A, enabling the transmitter to transmit the identity of said each participant A as well as the identities of all of said near neighbors B(A), and
(d) during any other one of the N second time slices;
  (i) enabling the receiver to receive any of the data transmitted by a participant M within the radius R thereof,
  (ii) updating the identities of said near neighbors B(A) of said each participant A, if necessary, according to an identity of the participant M by whom said data is transmitted,
  (iii) transmitting data by one of said near neighbors B(A) of said each participant A, deleting the identity of the participant M from said near neighbors B(A), and deleting from said far neighbors C(A) any near neighbors B(M) of said participant M who are not also said near neighbors B(A) of said each participant A, if the data have not been received.

* * * * *